(12) United States Patent
Takenaka

(10) Patent No.: US 6,692,394 B2
(45) Date of Patent: Feb. 17, 2004

(54) HYBRID DRIVING DEVICE

(75) Inventor: Masayuki Takenaka, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 09/870,712

(22) Filed: Jun. 1, 2001

(65) Prior Publication Data

US 2001/0051556 A1 Dec. 13, 2001

(30) Foreign Application Priority Data

Jun. 12, 2000 (JP) ........................................ 2000-176143

(51) Int. Cl.$^7$ .............................. B60K 1/02; B60K 41/26
(52) U.S. Cl. ........................ 475/5; 188/265; 192/219.5; 180/65.6
(58) Field of Search ............................ 475/1, 5; 477/2, 477/3; 188/69, 31, 265; 192/219.4, 219.5; 180/65.1, 65.3, 65.4, 65.6; 74/606 R

(56) References Cited

U.S. PATENT DOCUMENTS

| 4,225,026 | A | * | 9/1980 | Yamamori et al. ... 192/219.4 X |
| 4,719,999 | A | * | 1/1988 | Ohkubo ........................ 188/31 |
| 5,348,518 | A | * | 9/1994 | Taniguchi et al. .... 74/606 R X |
| 5,558,595 | A | | 9/1996 | Schmidt et al. |
| 5,643,119 | A | | 7/1997 | Yamaguchi et al. |
| 5,799,744 | A | * | 9/1998 | Yamaguchi et al. ........... 475/5 |
| 5,806,617 | A | * | 9/1998 | Yamaguchi ................ 475/5 X |
| 5,951,433 | A | | 9/1999 | Tsukamoto et al. |
| 6,135,914 | A | * | 10/2000 | Yamaguchi et al. ........ 475/5 X |
| 6,295,487 | B1 | * | 9/2001 | Ono et al. ............. 180/65.3 X |

FOREIGN PATENT DOCUMENTS

| FR | 2 774 039 A1 | | 7/1999 | |
| JP | 404085153 | * | 3/1992 | .............. 192/219.2 |

* cited by examiner

*Primary Examiner*—Ha Ho
(74) *Attorney, Agent, or Firm*—Oliff & Berridge, PLC

(57) ABSTRACT

A hybrid driving device including an engine shaft, a motor shaft, and a countershaft. A parking gear, which has been conventionally placed on the countershaft, is placed on the engine shaft to reduce torque loads applied to parts associated with a parking mechanism and, at the same time, the countershaft is placed so as not to overlap an engine or a motor in a radial direction as a result of an axial length being shortened, thereby shortening the distance between the engine shaft and the motor shaft. The parts associated with the parking mechanism are placed in a dead space of an oil pan near a valve body, supported by the valve body and a casing wall, thereby cutting down on space required for arrangement.

19 Claims, 10 Drawing Sheets

# HYBRID DRIVING DEVICE

BACKGROUND OF THE INVENTION

1. Field of Invention

The invention relates to a hybrid driving device that employs an engine and an electric motor for a power source. In particular, the invention relates to a placement structure of a parking mechanism in a hybrid driving device that transmits power from the engine and the electric motor to the wheels through a countershaft.

2. Description of Related Art

A hybrid driving device, which uses, as a power source, a combustion engine (which will be referred to as the engine in this specification), an electric motor, and a generator used in combination with an electric motor, transmits power from a plurality of systems to wheels which allows it to take a variety of power train configurations. Japanese Patent Application Laid-Open Publication No. HEI 8-183347 discloses a driving device with a placement configuration that establishes any given gear ratio to transmit the output from an engine and the output from an electric motor and a generator, respectively, to a differential device. In this driving device, in an attempt to make the axial length of the mechanism shorter, an end of the countershaft on the side of the electric motor, which substantially affects the overall axial length of the device, is placed between each of the coil ends of the generator and the electric motor so that a part of the countershaft overlaps the generator and the electric motor in terms of the axial direction relationship.

The driving device is provided, as a parking device that restricts the rotation of wheels, with a parking mechanism that locks a parking gear built into a power transmission path by bringing the parking mechanism into engagement with a parking pole. In the related-art driving device, the parking gear of the parking mechanism is placed between a driven gear (a third gear) and a differential drive pinion gear (a fourth gear) on the countershaft.

A drive plate, that functions as a flywheel and a damper device indispensable to a connection to the engine, an electric motor and a countershaft, forms the three component elements that affects the overall axial length of a hybrid driving device, apart from the engine. Among them, the countershaft is the major factor that determines the axial length of the driving device.

Looking at the hybrid driving device of the related art with special emphasis on the countershaft, the rear end of the countershaft is configured to overlap the coil end of the electric motor in the axial direction as explained earlier. This reduces the ratio of the countershaft occupying the axial length of the entire device, thus making compact the dimension in the axial direction. The adoption of such a configuration involves the placement of a shaft end of the countershaft in-between, which makes it necessary to allow a shaft-to-shaft distance between the generator mounted on an extension of the engine shaft and adjacent to the counter shaft in a radial direction at a similar position in the axial direction, and the electric motor mounted on a different shaft. This results in the dimensions of the radial direction of the entire device, namely the outline in a transverse direction of the shaft, becoming greater.

In the hybrid driving device of the related art, since the parking gear is inserted in a point on the countershaft, the axial length of the countershaft is prevented from being shortened for the length of the parking gear. As a result, compactness achieved through overlap in the axial direction of the rear end of the countershaft and the motor coil end is not sufficiently exploited.

SUMMARY OF THE INVENTION

The invention provides a hybrid driving device wherein a driving connection is established between an engine and an electric motor via a countershaft to wheels, to solve the above problem and to enhance the compactness of the device as a whole in an axial direction and a radial direction.

To achieve the foregoing, a hybrid driving device according to this invention is provided with an engine, a first electric motor placed on the same shaft as the engine, an output member placed on the same shaft as, and having a driving connection with, the engine and the first electric motor, a countershaft that is paralleled with the shaft and establishes for the output member a driving connection to wheels, and a parking mechanism that restricts rotation of the wheels. The hybrid driving device is characterized in that a parking gear of the parking mechanism is placed on the output member.

In the configuration according to a first exemplary aspect of this invention, since the parking gear is placed at a portion with a smaller torque amplification on an upstream side along a stream of power transmission as compared with the conventional configuration in which the parking gear is placed on the countershaft, it is possible to reduce the torque applied to the parking mechanism that restricts rotation of the parking gear, which allows the parking gear and other parking mechanism-related parts to be built compact.

The hybrid driving device according to this invention is provided with an engine, a second electric motor placed on a shaft different from that of the engine, an output member placed on the same shaft as, and having a driving connection with, the engine, a countershaft that is paralleled with the shaft and establishes for the output member a driving connection to wheels, and a parking mechanism that restricts rotation of the wheels. The hybrid driving device is characterized in that the countershaft is placed between the engine and the second electric motor in an axial direction and that a parking gear of the parking mechanism is placed on the output member.

In the configuration according to a second exemplary aspect of this invention, in addition to the above-mentioned advantage, it is not necessary to secure an axial length needed to place the parking gear on the countershaft, which makes it possible to shorten the axial length of the countershaft and eventually the overall length of the driving device. Furthermore, the countershaft does not overlap with the second electric motor mounted on a shaft different from the engine shaft in the axial direction. This allows the engine shaft to be brought as close as possible to the second electric motor shaft, which in turn makes it possible to keep small the dimension of the driving device in the radial direction.

If a differential device that transmits rotation of the countershaft to wheels is provided in either one of the above-mentioned configurations, it is effective to organize a configuration in which the countershaft transmits rotations of at least two shafts among an output member shaft, a second electric motor shaft, and a differential device shaft.

In the configuration according to another exemplary aspect of this invention, the same advantages as explained above can be obtained if the driving device is provided with a differential device that transmits rotation of the countershaft to wheels.

If the configuration is provided with a planetary gear that connects the engine and the first electric motor, it is effective to organize a configuration in which the parking gear is formed on an outer periphery of a ring gear of the planetary gear connected to the output member.

In the configuration according to another exemplary aspect of this invention, since the axial length can be reduced for the width of the parking gear in an arrangement in which the parking gear is placed on the output member, the overall length of the driving device in the axial direction can be further shortened.

In the above-mentioned configuration, it is effective to organize a configuration in which the output member is formed by a counter drive gear on the engine side, a first wall that supports the counter drive gear on the engine side provided between the counter drive gear on the engine side and the first electric motor, and a parking pole of the parking mechanism placed on the first wall.

In the configuration according to still another exemplary aspect of this invention, there is no need to provide a special member for placing the parking pole. Therefore the number of parts used and cost can be reduced and, at the same time, the space can be effectively utilized to build a compact driving device.

If a first electric motor is further placed on the same shaft as the engine in the configuration provided with the second electric motor, it is effective to organize a configuration in which the output member is formed by a counter drive gear on the engine side, a first wall that supports the counter drive gear on the engine side provided between the counter drive gear on the engine side and the first electric motor, and a parking pole of the parking mechanism placed in the first wall.

With the configuration according to yet another exemplary aspect of this invention, in the driving device provided with a first electric motor and a second electric motor, it is not necessary to provide a special member for placing the parking pole as described above, thereby reducing the number of parts used and cost and, at the same time, the space can be effectively utilized to build the driving device compact.

If a valve body is provided with a built-in oil pump in any of the above-mentioned configurations, it is also effective to organize a configuration in which parking mechanism-related parts are placed on a side opposite to the engine in an axial direction with respect to the valve body.

In the configuration according to another exemplary aspect of this invention, a bottom portion of the valve body with a built-in oil pump forms an oil sump having a relatively wide area. By placing parking mechanism-related parts in a dead space formed on a side opposite to the engine in the axial direction with respect to the valve body, effective use of space can be made based on the placement of parts not requiring special spaces for placement.

It is further possible to provide, in a configuration where a second wall forms in cooperation with the first wall, a planetary gear chamber accommodating the planetary gear, and an opening that permits engagement between the parking pole and the parking gear formed in the second wall.

In the configuration according to yet another exemplary aspect of this invention, by forming the parking gear on the ring gear of the planetary gear housed in the planetary gear chamber, the engagement of the parking pole with the parking gear through the second wall is made possible without reducing a gear supporting strength of the second wall that encloses the planetary gear accommodating chamber.

It is still further possible to allow a configuration in which the countershaft mutually connects the counter drive gear on the engine side forming the output member, a counter drive gear on the electric motor side provided on the shaft of the second electric motor, and the differential device, thereby transmitting rotation among three shafts of the output member shaft, the second electric motor shaft, and the differential device shaft.

In the configuration according to still another exemplary aspect of this invention, advantages can be obtained of making parking mechanism-related parts more compact, shortening the overall length of the driving device, and providing smaller dimensions in the radial direction based on synergistic effects of each of the above-mentioned advantages.

BRIEF DESCRIPTION OF THE DRAWINGS

Various embodiments of the invention will hereinafter be explained with reference to the following drawings, wherein.

DETAILED DESCRIPTION OF PREFERRED EMBODIMENTS

Figure 1:
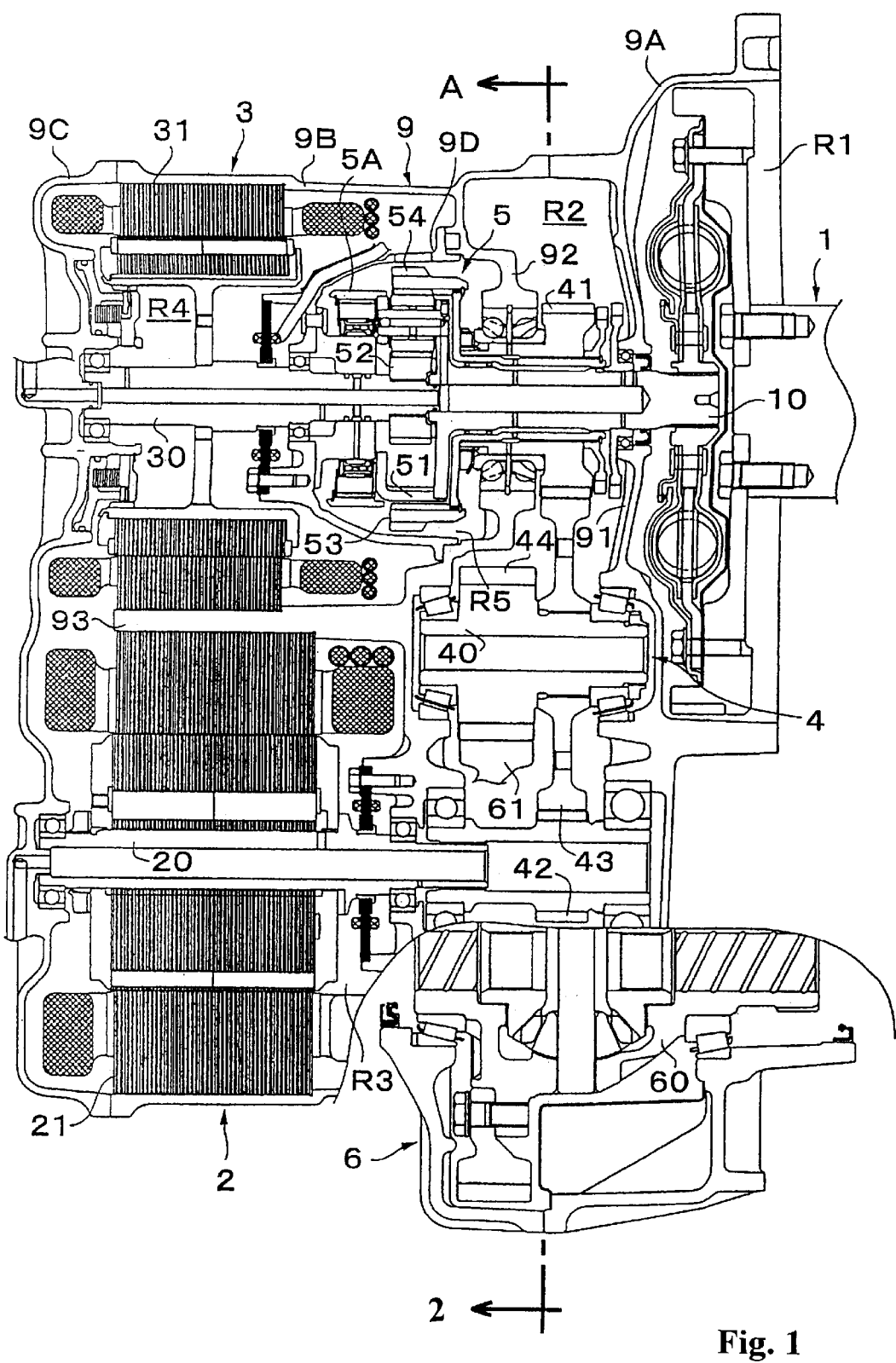
FIG. 1 is a sectional view, in an axial direction, showing the hybrid driving device according to the first exemplary embodiment of this invention.
Figure 2:
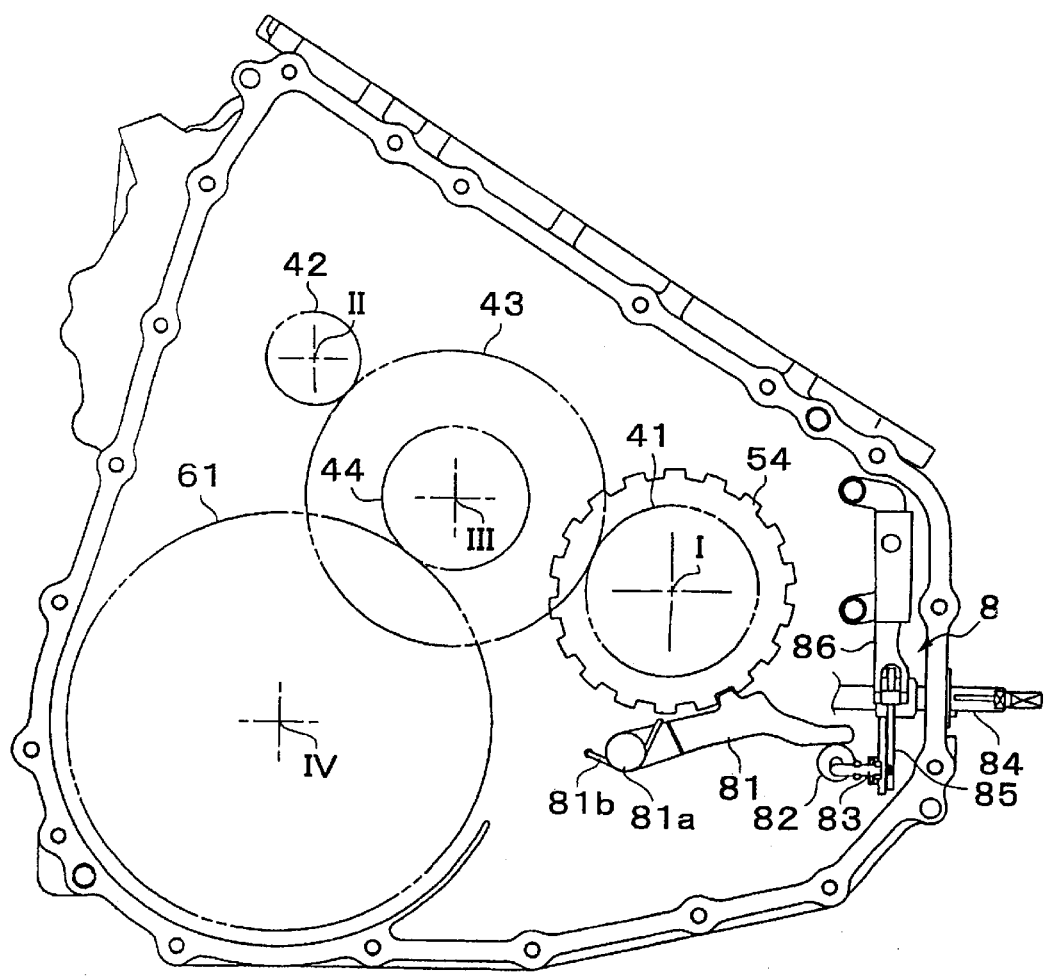
FIG. 2 shows a section 2—2 of FIG. 1.
Figure 3:
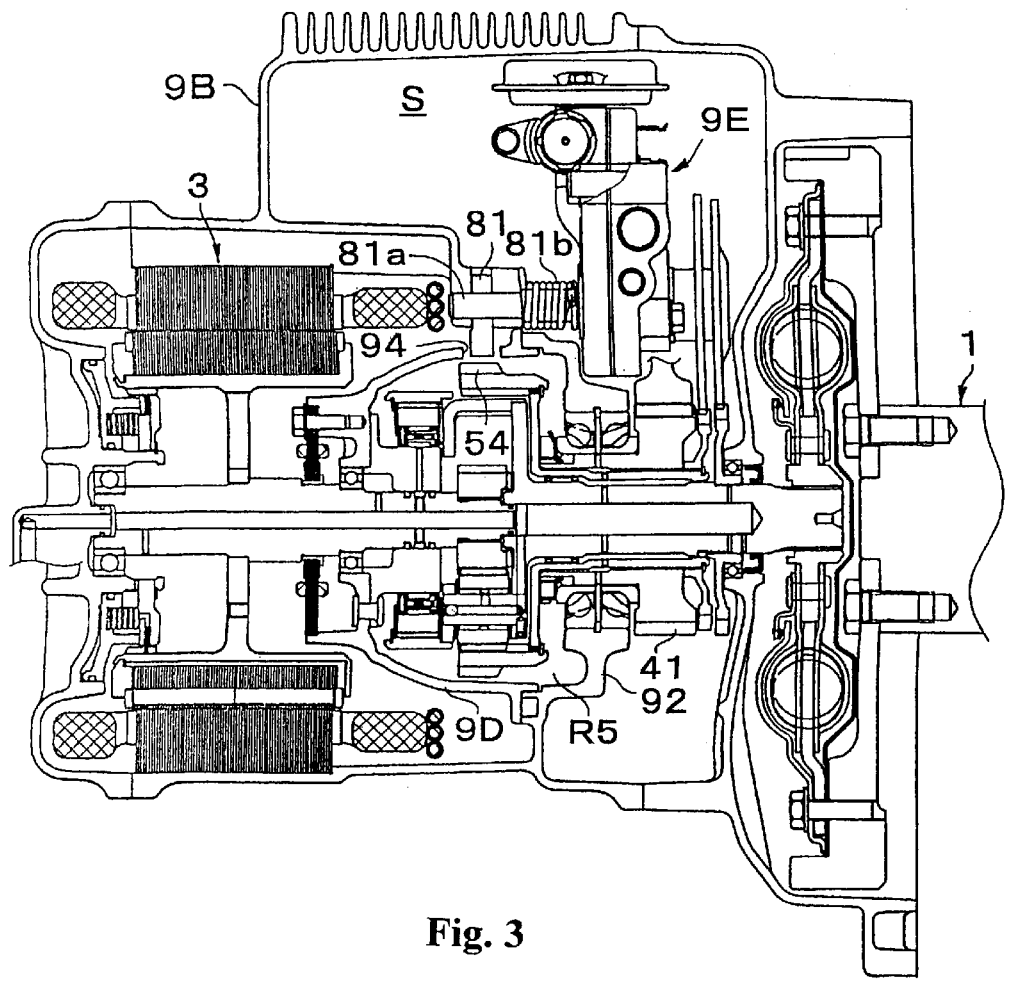
FIG. 3 is a sectional view, in an axial direction, showing the construction on the engine shaft side of the first exemplary embodiment.

The exemplary embodiments of the invention will be explained with reference to the attached drawings. FIGS. 1 to 3 represent a first exemplary embodiment of the invention as applied to a transversely mounted hybrid driving device intended for front-engine, front-drive (FF) vehicles. As shown in FIG. 1, this device is provided with an engine 1 with only the crankshaft rear end shown, a generator 3 functioning as a first electric motor placed on the same shaft as the engine 1 (in this specification, an electric motor and a generator used as an electric motor are collectively referred to as the electric motor and, throughout the explanations of the exemplary embodiments, the electric motor is called the motor and the generator is called the generator), a motor 2 functioning as a second electric motor placed on a shaft different from that of the engine 1, an output member placed on the same shaft as the engine 1 and the generator 3, a countershaft 40 that establishes for the output member a driving connection to wheels through a parallel shaft, and a differential device 6 (only a part of it is shown) that transmits rotation of the countershaft 40 to the wheels.

The driving device is further provided with a planetary gear 5 of a single pinion configuration that forms a differential gear unit connecting the engine 1 to the generator 3 and a parking mechanism that restricts rotation of wheels. The countershaft 40 is placed between the engine 1 and the generator 3, and at the same time, between the engine 1 and the motor 2, in an axial direction. The countershaft 40 transmits rotation among the three shafts including the shaft of the output member, the shaft of the generator 3 or the motor 2, and the shaft of the differential device 6. A parking gear 54 of the parking mechanism is connected to the output member. The output member in this arrangement is formed by a counter drive gear 41 connected to a ring gear 53 of the planetary gear 5 and the parking gear 54 formed on an outer periphery of the ring gear 53.

FIG. 2 shows the actual positional relationship of different shafts on a section 2—2 of FIG. 1 as viewed from the engine side. The driving device comprises four shafts, each being placed in parallel with each other as detailed in the following. Namely, a shaft of the engine 1 and the generator 3 (referred to as the engine shaft in this specification) is placed on a first axis I, a shaft of the motor 2 (referred to as the motor shaft in this specification) is placed on a second axis II, a shaft of the countershaft 40 of a counter gear mechanism 4 that transmits a power from the engine 1 and the motor 2 to the wheels (referred to as the countershaft in this specification) is placed on a third axis III, and a shaft of the differential device 6 interposed between the engine 1, the motor 2, and the wheels (referred to as the differential shaft in this specification) is placed on a fourth axis IV.

Each portion of the driving device will be explained in more detail with reference to FIG. 1. A casing 9 that accommodates and supports each of the component elements comprises a housing 9A that is connected to a crankcase (not shown) of the engine 1, a case 9B connected thereto, a rear cover 9C that covers a case end face, and a planetary gear case 9D placed in a case 9B. The housing 9A is of a configuration, in which a drive plate chamber R1 is isolated from a gear chamber R2 with an end wall 91. The case 9B is of a configuration, in which the gear chamber R2 is isolated from a motor chamber R3 and a generator chamber R4 with an end wall 92, while the motor chamber R3 is isolated from the generator chamber R4 with a peripheral wall 93. A rear cover 9C covers an open end face of the motor chamber R3 and the generator chamber R4. The planetary gear case 9D forms, in cooperation with the end wall 92, to define a planetary gear chamber R5 toward the front of the generator chamber R4.

The generator 3, the planetary gear 5 that establishes a driving connection between the generator 3 and the engine 1, and a one-way clutch 5A, that latches one of the elements of the planetary gear 5, are arranged on the engine shaft. These components are arranged in order of the counter drive gear 41 on the engine side, the planetary gear 5, the one-way clutch 5A, and the generator 3 in terms of the positional relationship along the axis. An output shaft 10, the front end of which is connected to a crankshaft of the engine 1 through a drive plate on the engine shaft and the outer periphery of which is mounted with the counter drive gear 41 on the engine side, is placed in the gear chamber R2 with both its ends supported by the end wall 91 and the end wall 92. The rear end of the output shaft is connected to a carrier 51 of the planetary gear 5, thus being provided with a drive connection to the generator 3 and the counter gear mechanism 4.

The generator 3 is placed so that a stator 31 is lockingly fit in a peripheral wall of the generator chamber R4 and the rear end of a rotor shaft 30 thereof is supported by a rear cover 9C, while a portion toward the front end is supported by the end wall 92 through the planetary gear case 9D. The front end of the rotor shaft 30 is connected to a sun gear 52 of the planetary gear 5 to establish a driving connection with the engine 1 and the counter gear mechanism 4. The planetary gear 5 is placed in the planetary gear case 9D and the ring gear 53 of the planetary gear 5 is connected to the counter drive gear 41 on the engine side rotatably supported on an outer periphery of the output shaft 10. The one-way clutch 5A, that latches one of the elements of the planetary gear 5, is placed on an outer periphery of the rotor shaft 30. An outer race of the one-way clutch 5A is connected to the carrier 51 of the planetary gear 5, while an inner race thereof is secured to the case 9B through the planetary gear case 9D.

As shown in FIG. 2, a parking mechanism 8 is arranged in the driving device. The parking mechanism 8 comprises the parking gear 54, a parking pole 81 that is engaged therewith, a cam 82 that urges the parking pole 81 in a direction of engagement with the parking gear 54 as guided by a guide (not shown) and fixed to the case 9B, a link 83 that advances and retracts the cam 82 in a direction of crossing with the parking pole 81, a shaft 84 that operates the link 83, a detent lever 85 that is secured to the shaft 84, and a detent spring 86 that is engaged with a notch in the detent lever 85. A reference numeral 81*a* in the illustration represents a support pin of the parking pole 81 and a reference numeral 81*b* represents a return spring. The parking gear 54 of the parking mechanism 8 is provided on the engine shaft according to this invention. In this arrangement, the parking gear 54 is integrally formed on an outer periphery of the ring gear of the planetary gear 5. The ring gear 53, which is in splined engagement with the counter drive gear 41, configures an output member on the engine shaft together with the counter drive gear 41.

As shown in FIG. 3, a section of an engine shaft portion in an axial direction and a first wall 92 that supports the counter drive gear 41 on the engine side is provided between the counter drive gear 41 on the engine side and the generator 3. The first wall 92 is formed by the end wall of the case 9B, to which the peripheral wall of the generator chamber R4 is connected. The parking pole 81 of the parking mechanism is placed in this first wall 92. The driving device is also provided with a valve body 9E having a built-in oil pump and parts associated with the parking mechanism placed on the side opposite to the engine 1 in an axial direction with respect to the valve body 9E. The space, in which the valve body 9E is placed in the illustration, is shown on an upward side due to the method of representation involved to match the representation of FIG. 1. The space is actually located below the case 9B and a bottom portion of the valve body 9E where a built-in oil pump forms an oil sump S having a relatively wide area. By placing parking mechanism-related parts in a dead space formed on a side opposite to the engine in the axial direction with respect to the valve body 9E, effective use of space is made by placement of parts not requiring special spaces for placement. Furthermore, an opening 94 that permits engagement between the parking pole 81 and the parking gear 54 is formed in a second wall which is the planetary gear case 9D that forms, in cooperation with the first wall 92, the planetary gear chamber R5 accommodating the planetary gear 5.

As shown in FIG. 1, the motor 2 is placed so that a stator 21 is lockingly fit in a peripheral wall of the motor chamber R3 and the rear end of a rotor shaft 20 thereof is supported by the rear cover 9C, while a portion toward the front end is supported by the end wall 92. The front end of the rotor shaft 20 is connected to a counter drive gear 42 on the motor side that is supported on both ends thereof by the end wall 91 and the end wall 92 in the gear chamber R2.

The counter gear mechanism 4 comprises both counter drive gears 41, 42, a counter driven gear 43 mounted on the countershaft 40 and commonly engaged therewith, and a drive pinion gear 44 mounted on the countershaft 40 for establishing a driving connection to the differential device 6. The countershaft 40, both ends of which are supported by the end wall 91 and the end wall 92, is placed in the gear chamber R2. According to the characteristics of this invention, the countershaft 40 is placed in terms of a positional relationship in an axial direction so that it does not overlap the motor 2 in a radial direction. To be more precise, an end portion of the shaft of the countershaft 40 extending toward the side of the motor 2 is terminated before a coil end which is the very end portion of the motor 2. In the driving device according to this exemplary embodiment, the engine 1 and the motor 2 are placed so that they do not overlap each other in terms of positional relationship in an axial direction. The countershaft 40 is therefore located between the engine 1 and the motor 2 in terms of positional relationship in the axial direction.

The differential device 6 that drivingly connects the countershaft 40 to the wheels is also placed in the gear chamber R2 with both ends of the differential case 60 thereof being supported by the end wall 91 and the end wall 92. In this arrangement, the counter driven gear 43 of the countershaft 40 is placed closer on the engine side than the drive pinion gear 44 engaged with a differential ring gear 61 secured to the differential case 60.

In the hybrid driving device of such a configuration, the motor 2 and the wheels (not shown) have a relation of direct coupling in terms of power transmission, though they do have a relation of reduction corresponding to the gear ratio of a gear train by way of the countershaft 40. On the other hand, the engine 1 and the generator 3 have a relation of indirect coupling in terms of power transmission, both mutually and by way of the planetary gear 5 with respect to the countershaft 40. By adjusting power generation loads of the generator 3 for the ring gear 53 that receives vehicle running loads through the differential device 6 and the countershaft 40, it becomes possible to run a vehicle according to a mode that appropriately varies the ratio of engine power output used as a driving force and a power generation energy (battery charging). In addition, when the generator 3 is driven as a motor, a reaction force that is applied to the carrier 51 of the planetary gear 5 is reversed. If, at this time, the one-way clutch 5A is used to latch the carrier 51 to the casing 9, the output from the generator 3 can be transmitted to the ring gear 53. This permits the driving force to be strengthened, which may be required when a vehicle is started (running in a parallel mode), through the use of both the motor 2 and the generator 3 producing outputs at the same time.

Since the parking gear 54 is placed at a portion with a smaller torque amplification on an upstream side along a stream of power transmission as compared with the conventional configuration in which the parking gear is placed on the countershaft, it is possible to reduce torque applied to the parking mechanism 8 that restricts rotation of the parking gear 54, which allows the parking gear 54 and other parts associated with the parking mechanism 8 to be built compact. The countershaft 40 does not overlap the generator 3 in the axial direction and accordingly the countershaft 40 occupies a greater percentage in the axial length direction of the entire length of the driving device. As compared with the conventional configuration, however, in which the parking gear is placed on the countershaft 40, the overall length of the driving device can be made shorter for the length of the parking gear. This eliminates the possibility of the dimension in the axial direction of the entire driving device becoming greater. Furthermore, the countershaft 40 does not overlap the motor 2 in the axial direction, either. This allows the engine shaft to be brought as close as possible to the motor shaft, which in turn makes it possible to keep small the dimension of the driving device in the radial direction.

As compared to the conventional configuration, the counter driven gear 43 of the countershaft 40 are located closer on the engine side than the differential drive pinion gear 44 provided on the countershaft 40 to drive the differential device 6, which shifts the position of the countershaft 40 in the axial direction toward the engine side. Since the direction of shift involved herein is, however, naturally restricted in connection with the placement position with respect to the vehicle, the shift is toward the direction of the dead space which has conventionally existed between the engine 1 and the differential device 6. This allows the driving device to be built compact, while placing the countershaft 40 at a location at which it does not overlap the motor 2 in the radial direction.

In this exemplary embodiment in which the driving device is provided with the generator 3, it is possible to place the generator 3 and the motor 2 so that their outlines are substantially brought as close as possible to each other without allowing the countershaft 40 to restrict the shaft-to-shaft distance between the engine and the motor. This permits a compact outline of the device in a direction transversely of the axis.

Furthermore, the generator 3, planetary gear 5, and the one-way clutch 5A are mounted on the same axis as the engine 1, placed in the order of the drive gear 41 on the engine side, planetary gear 5, one-way clutch 5A, and the generator 3 in positional relationship along the axis. This arrangement permits the placement of a gear train of the drive gears 41, 42 on the engine side and the motor side, and the driven gear 43 at a position closest to the engine 1, thereby eliminating a member protruding from the gear train toward the engine side so that the countershaft 40 can be shifted toward the engine side. As a result, the planetary gear 5, the outside diameter of which can therefor be made smaller than the generator 3, and the one-way clutch 5A accompanying therewith can be accommodated in a space inside a generator coil on the side of the generator 3. This eventually leads to a more compact dimension in the axial direction.

Figure 4:
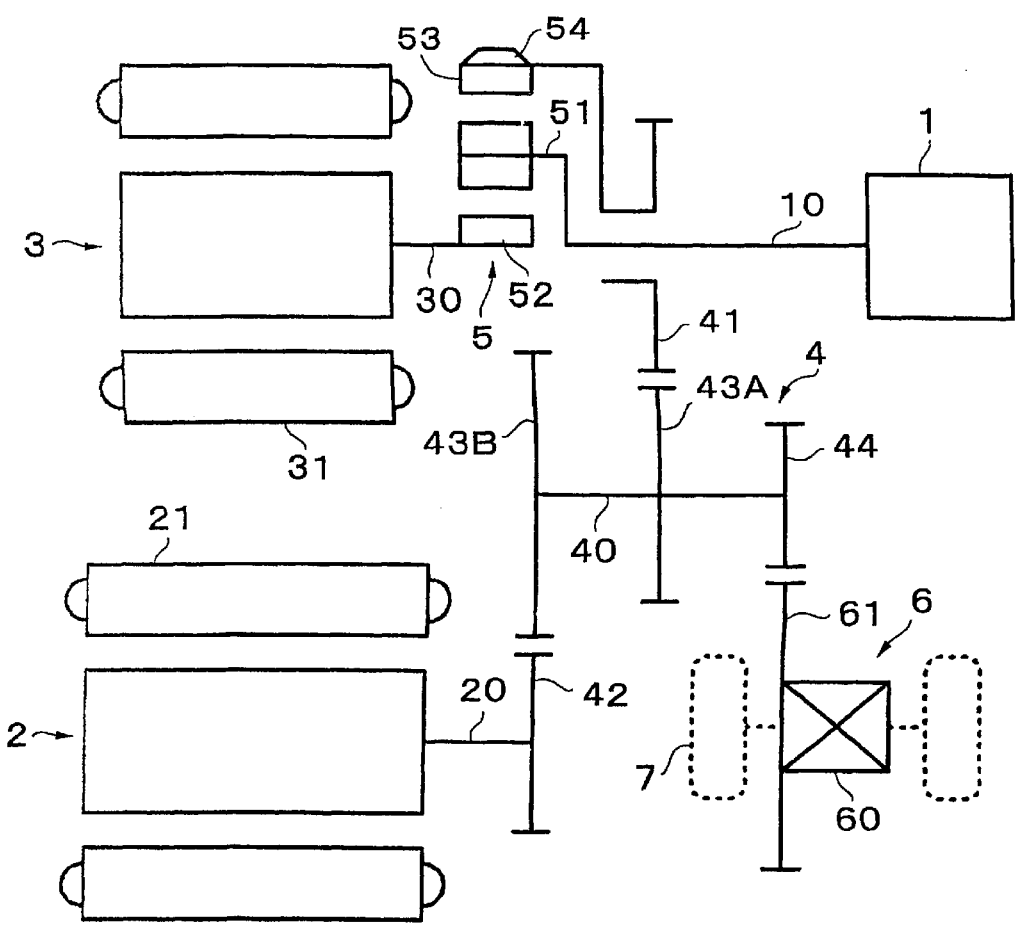
FIG. 4 is a skeleton drawing showing the hybrid driving device according to the second exemplary embodiment of this invention.
Figure 5:
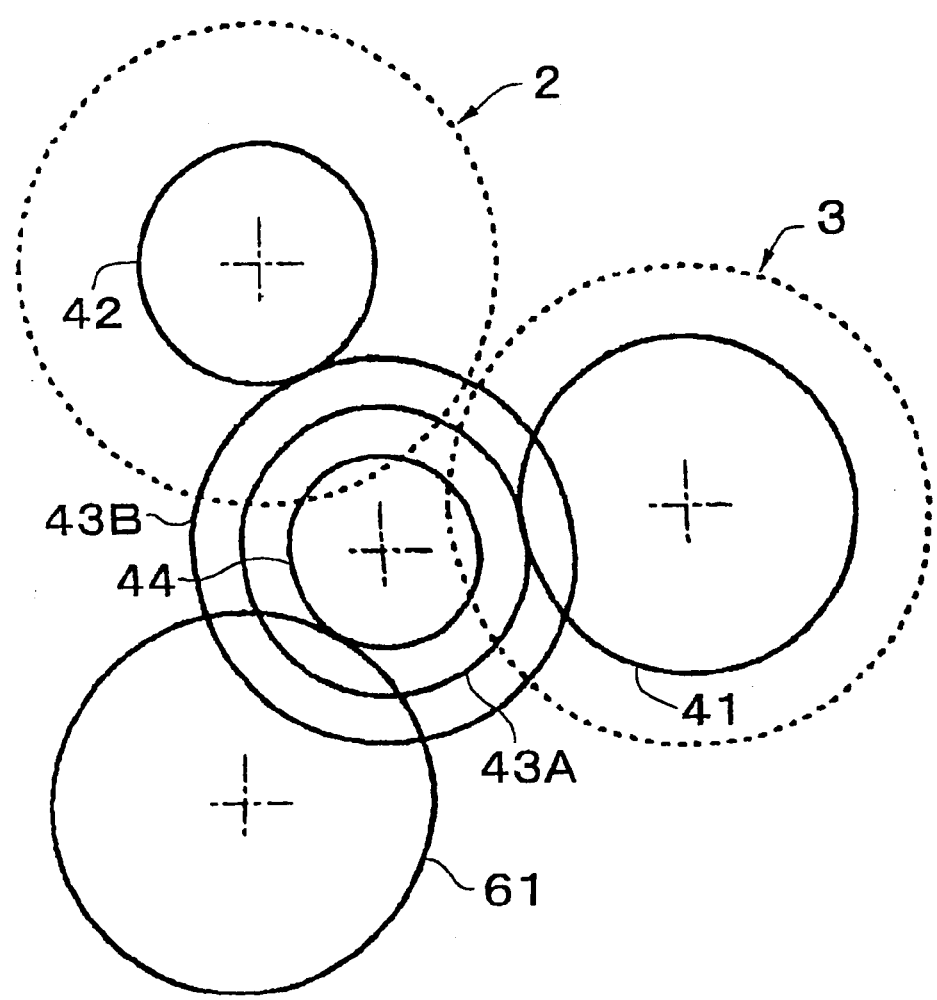
FIG. 5 is a gear engagement drawing showing the layout of different shafts according to the second exemplary embodiment.

FIGS. 4 and 5 are a skeleton drawing and a shaft layout drawing of a second exemplary embodiment, in which the first exemplary embodiment is changed in the counter gear mechanism 4 portion. This exemplary embodiment is configured so that a first counter driven gear and a second counter driven gear 43A, 43B on the countershaft 40 are engaged independently with the counter drive gear 41 on the engine side and the counter drive gear 42 on the motor side, respectively. It shares substantially the same configuration as the first exemplary embodiment, thus the remaining portions and explanations thereof are omitted with the same reference numerals assigned to the corresponding elements (this holds true with subsequent new embodiments). The one-way clutch is omitted in the layout drawing shown. In addition, it is noted that the differential drive pinion gear 44 on the countershaft 40 and the differential ring gear 61 of the differential device 6, having a driving connection to a wheel 7, are placed closer on the engine side than the counter driven gears 43A, 43B in terms of positional relationship along the axis. Thus, this arrangement is reversed to place the counter driven gears 43A, 43B closer on the engine side than the differential drive pinion gear 44 and the differential ring gear 61, just as in the first exemplary embodiment. In FIG. 5, the outside diameter of the generator 3 and the outside diameter of the motor 2 are indicated by dotted lines.

In this arrangement, too, the increase in the axial length of the driving device can be prevented, as in the first exemplary embodiment, by canceling out the increase in the length in the axial direction of the portions of the countershaft 40, which do not overlap the generator 3 and the motor 2 in the axial direction, by a reduction in the space for the placement of the parking gear. Moreover, by making use of the fact that the countershaft 40 does not overlap the generator 3 or the motor 2 in the axial direction, the shaft-to-shaft distance of the driving device, particularly the distance between the engine shaft and the motor shaft, can be made as small as possible, as shown in FIG. 5, thus making the dimension in the radial direction compact.

Figure 6:
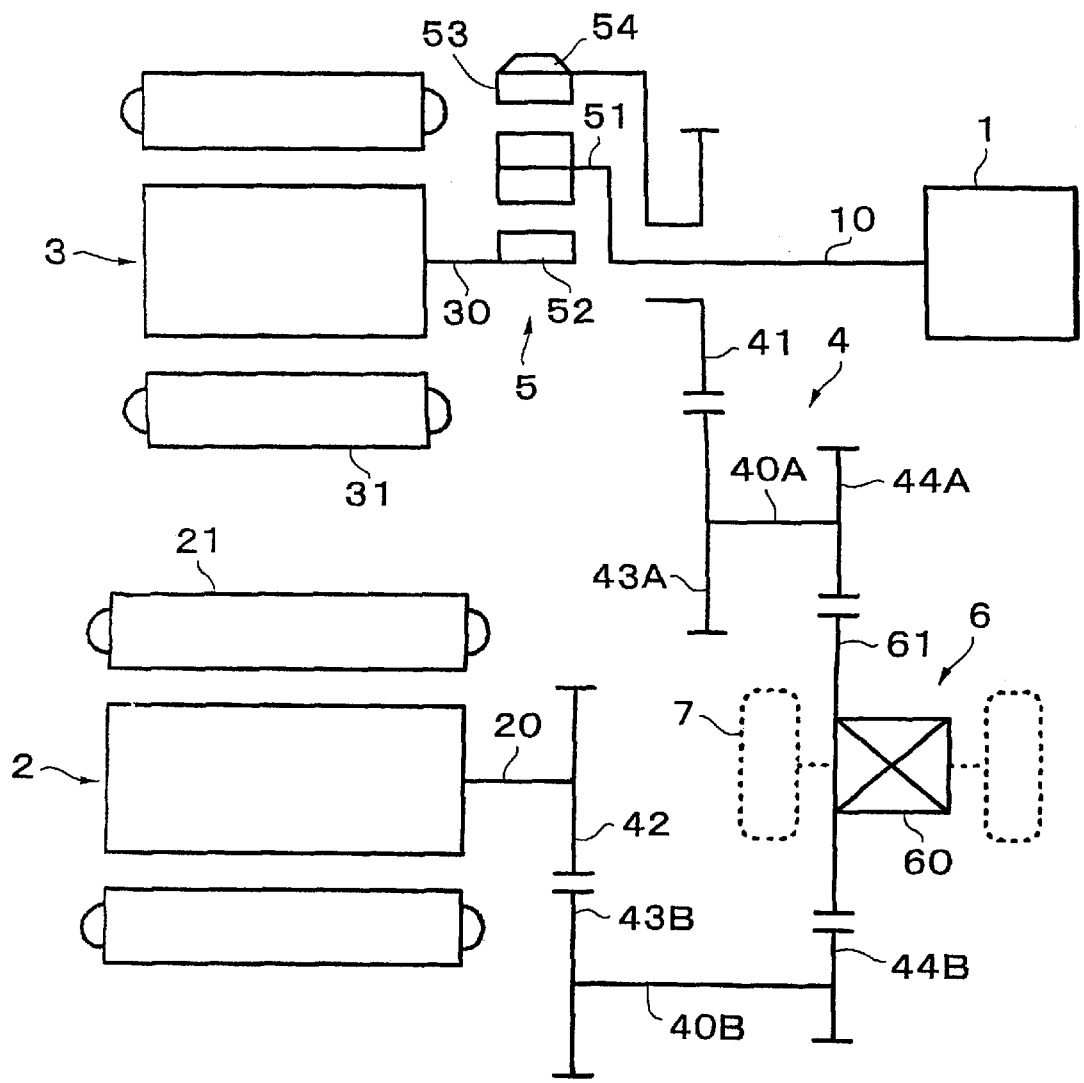
FIG. 6 is a skeleton drawing showing the hybrid driving device according to the third exemplary embodiment of this invention.
Figure 7:
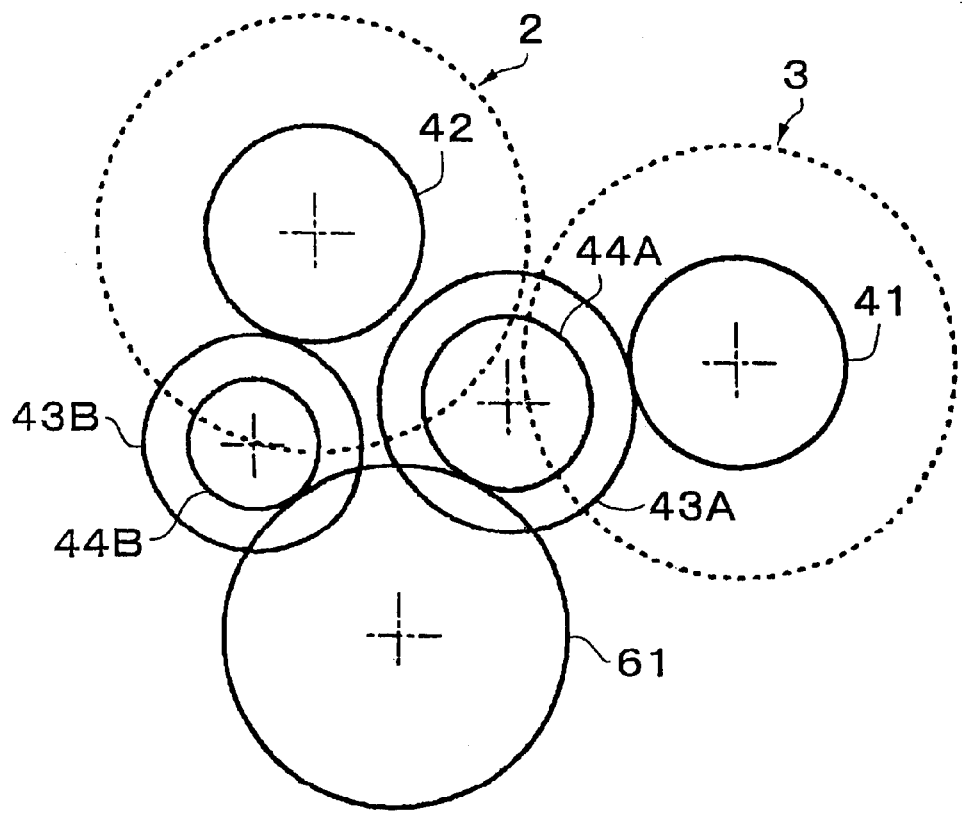
FIG. 7 is a gear engagement drawing showing the layout of different shafts according to the third exemplary embodiment.

FIGS. 6 and 7 are a skeleton drawing and a shaft layout drawing of a third exemplary embodiment, in which the first exemplary embodiment is changed so that the power transmission on the engine shaft side and the power transmission on the motor shaft side are accomplished through the corresponding exclusive countershafts. In this arrangement, a driving connection is established from the counter drive gear 41 on the engine shaft side through the counter driven gear 43A and the differential drive pinion gear 44A of the countershaft 40A on the engine side to the differential ring gear 61 of the differential device 6 while a driving connection is established from the counter drive gear 42 on the motor shaft side through the counter driven gear 43B and the differential drive pinion gear 44B of the countershaft 40B on the motor side to the differential ring gear 61 of the differential device 6. There is, in this case, an arrangement provided in which the differential drive pinion gear 44A of the countershaft 40A on the engine shaft side and the differential drive pinion gear 44B of the countershaft 40B on the motor shaft side are engaged with the differential ring gear 61 at a point closer on the engine side than the counter driven gears 43A, 43B. In this case, too, the outside diameter of the generator 3 and the outside diameter of the motor 2 are indicated by dotted lines in FIG. 7.

The same advantages can be obtained from this arrangement as those obtained from the first and second exemplary embodiments. Particularly with this arrangement, since the driving connection by way of the countershaft 54 is parallel between the engine side and the motor side, the total gear ratio on the engine side and the total gear ratio on the motor side can be changed by simply changing the axis position of the countershaft 54, with the axes of the remaining three shafts remaining unchanged. The maximum advantages can thus be exploited from the placement of the parking gear 54 on the engine shaft side that requires no relocation of the parts associated with the parking mechanism 8 when attempting to change the total gear ratio.

Figure 8:
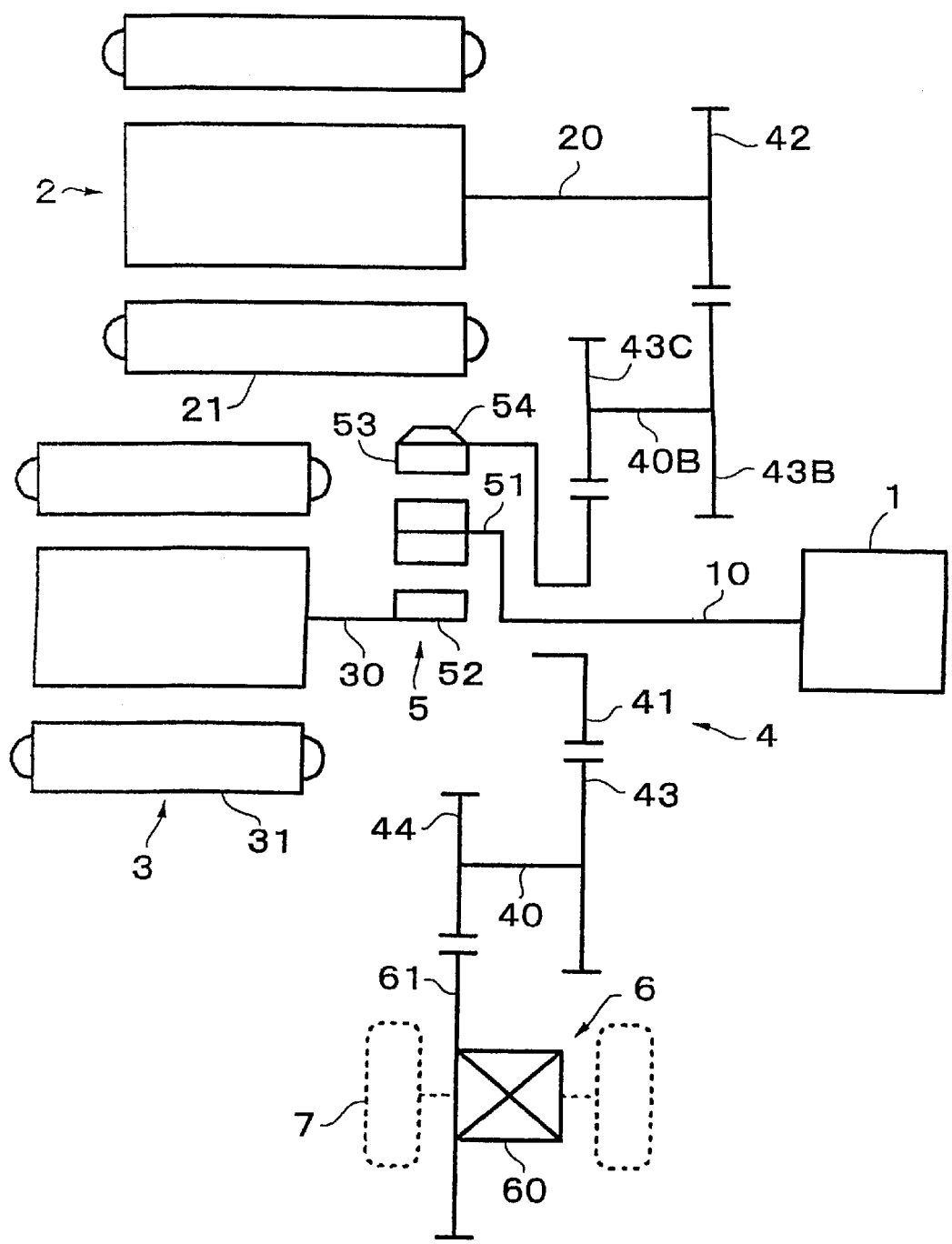
FIG. 8 is a skeleton drawing showing the hybrid driving device according to the fourth exemplary embodiment of this invention.

FIG. 8 is a skeleton drawing showing a fourth exemplary embodiment, in which power transmission on the motor shaft side is accomplished through the engine shaft, which is different from any of the foregoing exemplary embodiments. In this arrangement, a second countershaft 40B on the motor side is provided between the motor shaft and the engine shaft on a power transmission path and a countershaft 40 shared between the motor side and the engine side is provided between the engine shaft and a differential shaft. To be more precise, the counter drive gear 42 on the motor shaft is engaged with the counter driven gear 43B on the second countershaft 40B, the drive gear 43C on the second countershaft is engaged with the counter drive gear 41 on the engine shaft, and the counter driven gear 43 and the differential drive pinion gear 44 on the countershaft 40 are engaged with the counter drive gear 41 and the differential ring gear 61, respectively, on the engine shaft. In this arrangement, too, the parking gear 54 is formed on an outer periphery of the ring gear 53 of the planetary gear 5.

This arrangement also yields the same advantages as those obtained in each of the exemplary embodiments. Though the counter gear mechanism 4 is relatively complicated in this arrangement, it is easier to set the total gear ratio on the motor side greater, which permits a compact outline of the device owing to the adoption of a small motor.

Figure 9:
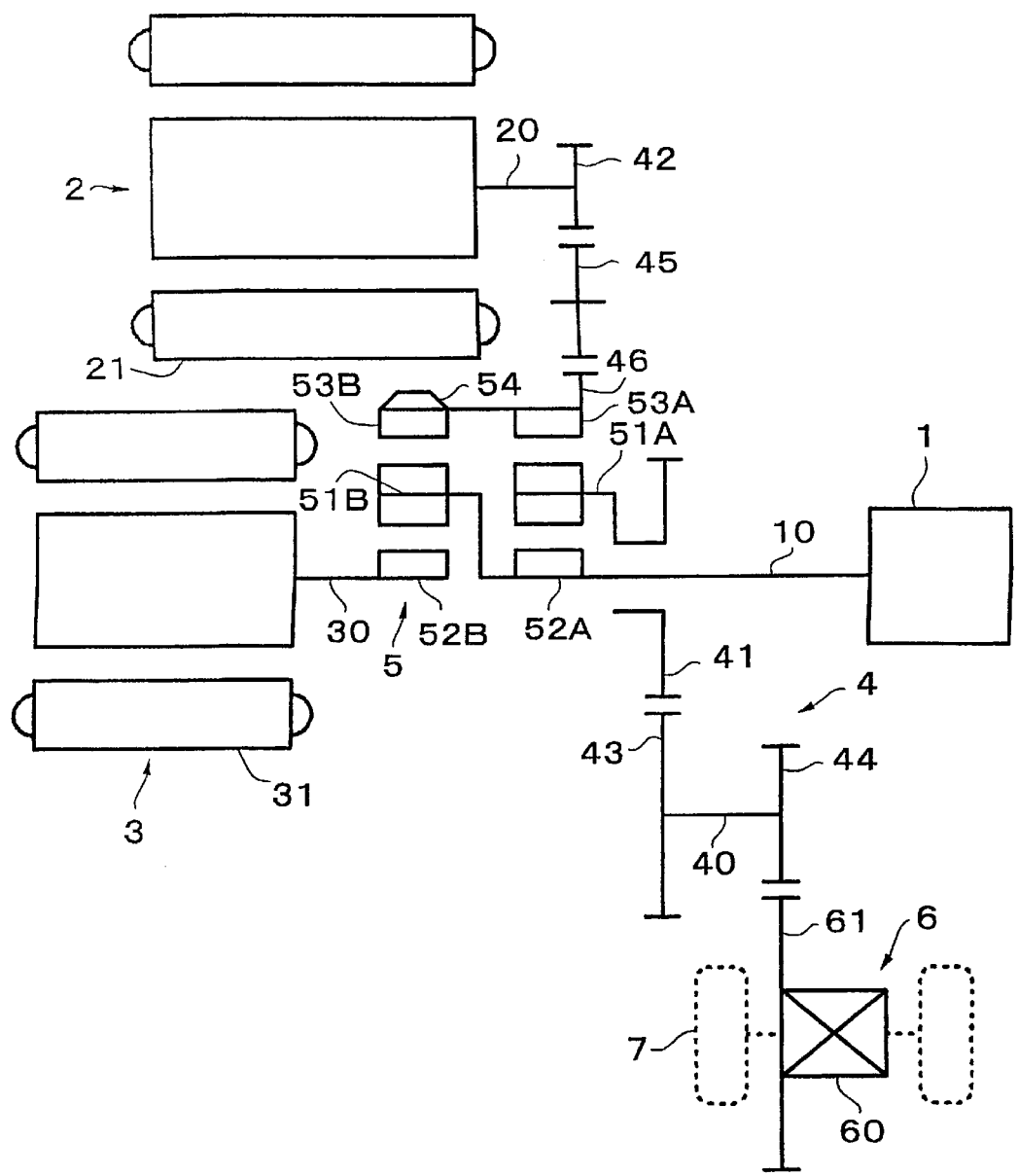
FIG. 9 is a skeleton drawing showing the hybrid driving device according to the fifth exemplary embodiment of this invention.

FIG. 9 is a skeleton drawing showing a fifth exemplary embodiment that results from changing the planetary gear 5 portion and the power transmission system on the motor shaft side of the fourth exemplary embodiment. In this arrangement, the planetary gear 5 comprises a combination of two sets of simple planetary gears. A sun gear 52A of a front stage connected to the output shaft 10 of the engine 1 is interconnected with a carrier 51B of a rear stage, a sun gear 52B of a rear stage is connected to a rotor shaft 30 of the generator 3, ring gears 53A, 53B of a front and rear stage are interconnected, an input gear 46 to the engine shaft is provided on an outer periphery of a ring gear 53A of a front stage, a driving connection is established between this input gear 46 via an idler gear 45 to the counter drive gear 42 on the motor shaft side, and a carrier 51A of a front stage is connected to the counter drive gear 41 on the engine shaft to form an output member. In this arrangement, the parking gear 54 is formed on an outer periphery of the ring gear 53B of the rear stage.

In this configuration, there is a relationship of an indirect driving connection established between all of the engine 1, the motor 2, and the generator 3, and the differential device 6 through the planetary gear 5. The advantages brought about by the placement of the parking gear 54 on the engine shaft nonetheless remain the same as those in each of the above-mentioned exemplary embodiments.

Figure 10:
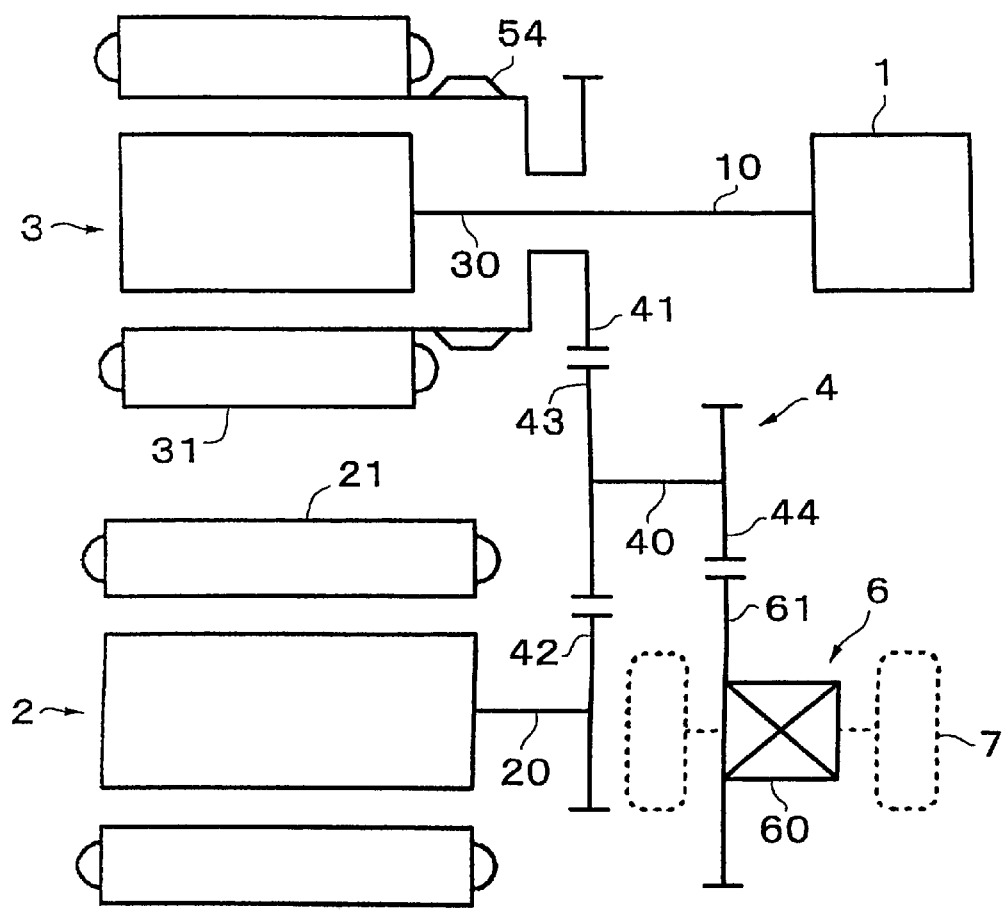
FIG. 10 is a skeleton drawing showing the hybrid driving device according to the sixth exemplary embodiment of this invention.

Finally, a sixth exemplary embodiment shown in skeleton in FIG. 10 employs a configuration in place of the planetary gear 5 in the first exemplary embodiment, in which the output shaft 10 of the engine 1 is directly connected to the rotor shaft 30 of the generator 3, and the side of the stator 31 of the generator 3 is rotatably supported with respect to the casing to be directly connected to the counter drive gear 41 on the engine side. In this arrangement, the parking gear 54 is provided on an outer periphery of an extension portion of the stator 31 that is extended to make use of the space in which the planetary gear is placed in the first exemplary embodiment. In this arrangement also, the pinion gear 44 engaged with the differential ring gear 61 is placed, on the countershaft, closer on the engine side than the driven gear 43, in terms of positional relationship, along the axis according to what is shown in FIG. 10. It goes without saying that this layout can be reversed so that the driven gear 43 is closer on the engine side than the pinion gear 44 as in the first exemplary embodiment.

The same advantages can still be achieved as those of the first exemplary embodiment even with this arrangement. In this arrangement, there is a relationship of direct connection between the motor 2 and the wheel 7 in terms of power transmission, while there is a relationship of indirect connection between the engine 1 and the generator 3, both mutually and through the stator 31 with respect to the countershaft 40 in terms of power transmission. Even in this arrangement, therefore, by adjusting power generation loads of the generator 3 for the stator 31 that receives vehicle running loads through the differential device 6 and the countershaft 40, it becomes possible to run a vehicle according to a mode that appropriately varies the ratio of engine power output used as a driving force and a power generation energy (battery charging). In addition, driving the generator 3 as an outer rotor type motor will allow the drive gear 41 on the engine side to be driven, which enables the driving force to be strengthened (running in a parallel mode), which may be required when a vehicle is started, through the use of both the motor 2 and the generator 3 producing outputs at the same time.

The explanations were based on six exemplary embodiments embodied as transversely mounted driving devices for exclusive use with FF vehicles. It will be understood that it is not intended to limit the invention to those exemplary embodiments. It is possible to embody the invention in a driving device for rear-engine, rear-drive vehicles and a longitudinally mounted driving device for front-engine, rear-drive vehicles not integrating a differential device. Within the scope of the claims, the invention may be practiced otherwise with necessary changes made in the configuration.

What is claimed is:

1. A hybrid driving device, comprising:
   an engine;
   a first electric motor placed on a same axis as the engine;
   an output member placed on the axis and having a driving connection with the engine and the first electric motor;
   a countershaft that is parallel with the axis and establishes for the output member a driving connection to wheels;
   a parking mechanism that restricts rotation of the wheels, wherein a parking gear of the parking mechanism is placed on the output member; and
   a valve body having a built-in oil pump, wherein parking mechanism-related parts are placed on a side opposite to the engine in an axial direction with respect to the valve body.

2. The hybrid driving device according to claim 1, further comprising a differential device that transmits rotation of the countershaft to the wheels, wherein the countershaft transmits rotations of at least two shafts among an output member shaft, a second electric motor shaft, and a differential device shaft.

3. The hybrid driving device according to claim 2, further comprising a planetary gear that connects the engine to the first electric motor, wherein the parking gear is formed on an outer periphery of a ring gear of the planetary gear connected to the output member.

4. The hybrid driving device according to claim 3, wherein the output member is formed by a counter drive gear on an engine side, a first wall that supports the counter drive gear on the engine side provided between the counter drive gear on the engine side and the first electric motor, and a parking pole of the parking mechanism placed in the first wall.

5. A hybrid driving device according to claim 1, further comprising a second wall that forms, in cooperation with a first wall, a planetary gear chamber accommodating a planetary gear, wherein an opening that permits engagement between a parking pole and the parking gear is formed in the second wall.

6. A hybrid driving device, comprising:
   an engine placed on a first axis;
   a second electric motor placed on a second axis different from the first axis;
   an output member placed on the first axis and having a driving connection with the engine;
   a countershaft, parallel with the first axis, and establishes for the output member a driving connection to wheels;
   a parking mechanism that restricts rotation of the wheels, wherein the countershaft is placed between the engine and the second electric motor in an axial direction, a parking gear of the parking mechanism is placed on the output member and an end portion of the countershaft, located at an axial side of the second electric motor, is arranged at an axial engine side of a coil end of the second electric motor located at an axial side of the engine; and a first electric motor placed on the first axis, wherein the output member is formed by a counter drive gear on an engine side, a first wall that supports the counter drive gear on the engine side provided between the counter drive gear on the engine side and the first electric motor, and a parking role of the parking mechanism placed in the first wall.

7. A hybrid driving device according to claim 6, further comprising a differential device that transmits rotation of the countershaft to the wheels, wherein the countershaft transmits rotations of at least two shafts among an output member shaft, a second electric motor shaft, and a differential device shaft.

8. A hybrid driving device according to claim 7, further comprising a planetary gear that connects the engine to the first electric motor, wherein the parking gear is formed on an outer periphery of a ring gear of the planetary gear connected to the output member.

9. A hybrid driving device according to claim 8, further comprising a valve body having a built-in oil pump, wherein parking mechanism-related parts are placed on a side opposite to the engine in an axial direction with respect to the valve body.

10. A hybrid driving device according to claim 8, further comprising a second wall that forms, in cooperation with a first wall, a planetary gear chamber accommodating the planetary gear, wherein an opening that permits engagement between a parking pole and the parking gear is formed in the second wall.

11. A hybrid driving device according to claim 7, further comprising a valve body having a built-in oil pump, wherein parking mechanism-related parts are placed on a side opposite to the engine in an axial direction with respect to the valve body.

12. A hybrid driving device according to claim 7, further comprising a second wall that forms, in cooperation with a first wall, a planetary gear chamber accommodating a planetary gear, wherein an opening that permits engagement between a parking pole and the parking gear is formed in the second wall.

13. A hybrid driving device according to claim 7, wherein the countershaft mutually connects a counter drive gear on an engine side forming the output member, a counter drive gear on the electric motor side provided on the second shaft, and the differential device, thereby transmitting rotation among three shafts of the output member shaft, the second electric motor shaft, and the differential device shaft.

14. A hybrid driving device according to claim 6, further comprising a planetary gear that connects the engine to the first electric motor, wherein the parking gear is formed on an outer periphery of a ring gear of the planetary gear connected to the output member.

15. A hybrid driving device according to claim 14, further comprising a valve body having a built-in oil pump, wherein parking mechanism-related parts are placed on a side opposite to the engine in an axial direction with respect to the valve body.

16. A hybrid driving device according to claim 14, further comprising a second wall that forms, in cooperation with the first wall, a planetary gear chamber accommodating the planetary gear, wherein an opening that permits engagement between the parking pole and the parking gear is formed in the second wall.

17. A hybrid driving device according to claim 6, further comprising a valve body having a built-in oil pump, wherein parking mechanism-related parts are placed on a side opposite to the engine in an axial direction with respect to the valve body.

18. A hybrid driving device according to claim 6, further comprising a second wall that forms, in cooperation with the first wall, a planetary gear chamber accommodating a planetary gear, wherein an opening that permits engagement between the parking pole and the parking gear is formed in the second wall.

19. A hybrid driving device according to claim 6, further comprising a planetary gear that connects the engine to the first electric motor, wherein the output member is directly connected to one element of the planetary gear.

* * * * *